United States Patent
Pirotte et al.

(10) Patent No.: US 11,640,311 B2
(45) Date of Patent: May 2, 2023

(54) PROVIDING NON-VOLATILE STORAGE FOR PERMANENT DATA TO VIRTUAL MACHINES

(71) Applicant: EMC IP Holding Company LLC, Hopkinton, MA (US)

(72) Inventors: Serge Pirotte, Coventry, RI (US); John Krasner, Coventry, RI (US); Chakib Ouarraoui, Watertown, MA (US); Mark Halstead, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/552,558

(22) Filed: Aug. 27, 2019

(65) Prior Publication Data

US 2021/0064403 A1    Mar. 4, 2021

(51) Int. Cl.
*G06F 9/455*     (2018.01)
*G06F 12/109*    (2016.01)
*G06F 9/50*      (2006.01)
*G06F 12/14*     (2006.01)

(52) U.S. Cl.
CPC ........ *G06F 9/45558* (2013.01); *G06F 9/5016* (2013.01); *G06F 12/109* (2013.01); *G06F 12/145* (2013.01); *G06F 2009/45583* (2013.01); *G06F 2212/151* (2013.01)

(58) Field of Classification Search
CPC .. G06F 9/45558; G06F 9/5016; G06F 12/109; G06F 12/145; G06F 2212/151; G06F 2009/45583
See application file for complete search history.

(56) References Cited

U.S. PATENT DOCUMENTS

| | | | | |
|---|---|---|---|---|
| 9,195,593 | B1* | 11/2015 | Radovic | G06F 11/073 |
| 2009/0003828 | A1* | 1/2009 | So | H04L 61/103 |
| | | | | 398/56 |
| 2011/0138147 | A1* | 6/2011 | Knowles | G06F 9/45558 |
| | | | | 711/170 |
| 2018/0074863 | A1* | 3/2018 | Kung | G06F 3/0604 |
| 2019/0370044 | A1* | 12/2019 | Tsirkin | G06F 12/109 |

* cited by examiner

*Primary Examiner* — David Yi
*Assistant Examiner* — Nicholas A. Paperno
(74) *Attorney, Agent, or Firm* — Krishnendu Gupta; Nikhil Patel

(57) ABSTRACT

One or more aspects of the present disclosure relate to allocating virtual memory to one or more virtual machines (VMs). The one or more VMs can be established by a hypervisor of a storage device. The virtual memory can be allocated to the established one or more VMs. The virtual memory can correspond to non-volatile (NV) memory of a global memory of the storage device.

14 Claims, 4 Drawing Sheets ial memory.

PROVIDING NON-VOLATILE STORAGE FOR PERMANENT DATA TO VIRTUAL MACHINES

BACKGROUND

Virtual Memory is a storage allocation scheme in which secondary memory can be addressed as though it were part of main memory. For example, memory addresses used by a program or virtual machine (VM), called virtual addresses, are mapped to physical addresses in physical memory. Accordingly, the addresses the program or VM may use to reference the physical memory are distinguished from the addresses the memory system uses to identify physical storage sites, and generated virtual addresses are translated automatically to corresponding machine addresses of the physical memory.

SUMMARY

One or more aspects of the present disclosure relate to allocating virtual memory to one or more virtual machines (VMs). The one or more VMs can be established by a hypervisor of a storage device. The virtual memory can be allocated to the established one or more VMs. The virtual memory can correspond to non-volatile (NV) memory of a global memory region of the storage device.

In embodiments, the NV memory can include one or more of: read-only memory, flash memory, and ferroelectric random-access memory (RAM).

In embodiments, a profile of a guest user operating at least one of the VMs via an external computing device can be determined.

In embodiments, an amount of NV memory to allocate the at least one of the VMs operated by the guest user based on the determined profile can be determined.

In embodiments, blocks of NV memory of the global memory available for allocation to the one or more VMs can be identified.

In embodiments, the blocks of NV memory can be non-contiguous blocks of NV memory of the global memory.

In embodiments, the non-contiguous blocks of NV memory can be represented as a contiguous block of virtual NV memory to the one or more VMs.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

A hypervisor (e.g., hypervisor 22 of FIG. 1) can be computer software, firmware, hardware, or any combination thereof that creates and runs virtual machines (VMs). A hypervisor can run one or more VMs on a computing device such as a data storage system (e.g., system 12 of FIG. 1). Each VM can be called a guest machine. The hypervisor can provision each quest machine with a guest operating system and manage the execution of the guest operating systems. The guest operating systems may share virtualized hardware resources (e.g., processors and memory) of the data storage system.

The guest machines may need to store and retrieve permanent information (e.g., information that is recoverable after loss of power and/or re-instantiation of guest machines after a termination event) through a means provided by the hypervisor. Current naïve solutions use external devices or drives for such storage needs. In many instances, a data storage system may not be able to practically connect to such external devices. For example, an external non-volatile (NV) hardware device may need to interface with an external slot of the data storage system. However, the data storage system may only have a limited number of available slots and connecting such a device may also increase power consumption requirements of the data storage device. External devices may also only be accessible by a single entity. Thus, only one of multiple simultaneous guest machines a data storage system can support can access the external device.

In addition, external devices such as external disk drives may be too slow for efficient, fast access to large amounts of data that can be required by guest machines that need to save and retrieve large amounts of data during startup and shutdown of the guest machine and/or the storage system. For example, the speed at which information is saved and retrieved can be critical to provide computing services as fast as possible. In cases of power loss, the guest machines may need to save a vast amount of information as quickly as possible to limit a size of an external uninterruptible power supply (UPS).

Embodiments of the present disclosure can allocate virtual NV memory to one or more guest machines where the virtual NV memory corresponds to physical NV memory of the global memory of the data storage system. Such allocation eliminates the need to use an external device housed within an external slot of the data storage system. It can be appreciated that reducing and/or eliminated usage of external slots can reduce power consumption requirements of the storage system. In embodiments where the global memory is built on random-access memory (RAM), such allocation provides a speed of read and writes that can be comparable to the fastest memory read and write speeds known to those skilled in the art. It can be appreciated that some guest machines may have minimum required speeds of data access during startup, shutdown, and power loss situations.

Figure 1:
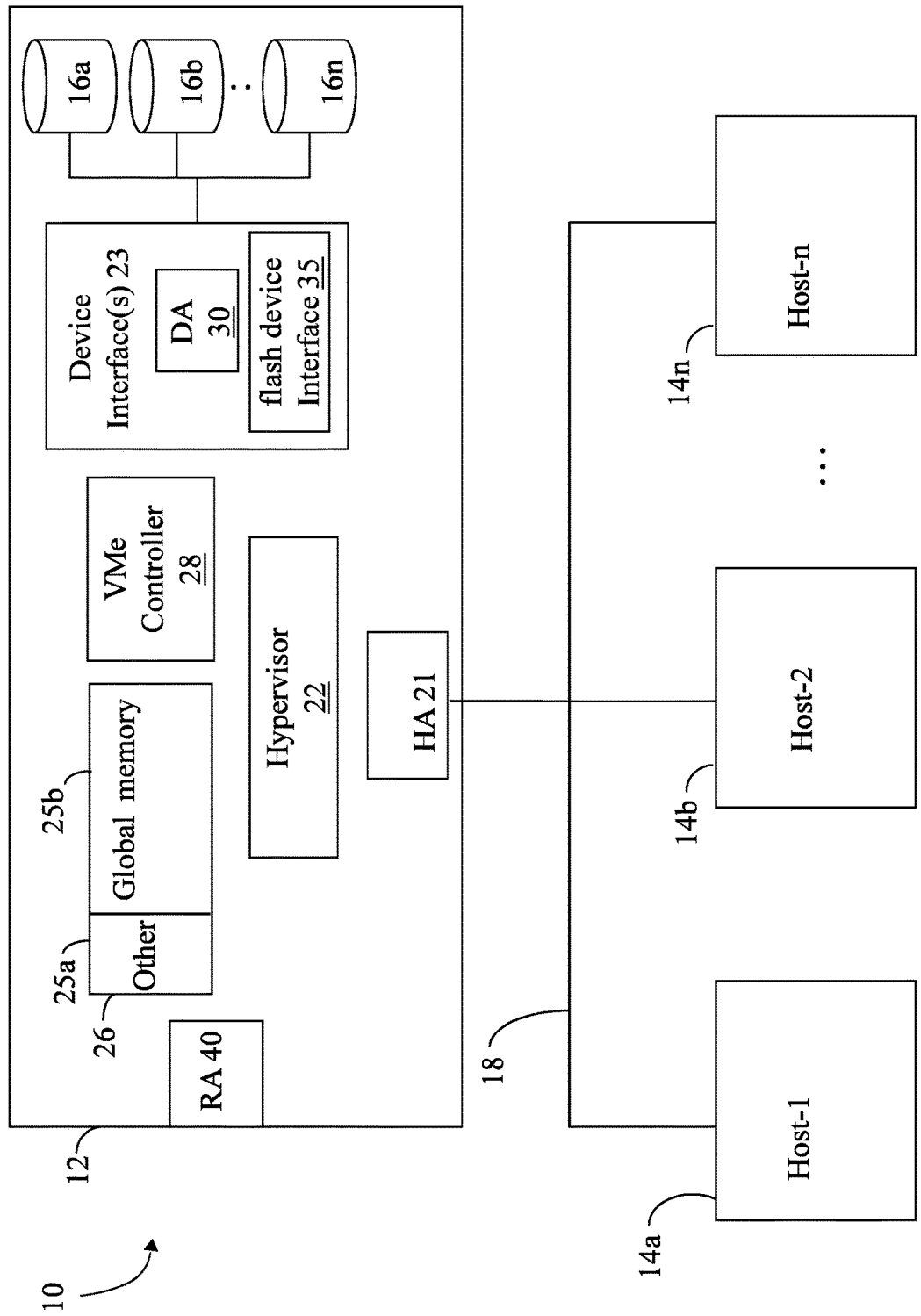
FIG. 1 is a block diagram of an example a storage system in accordance with example embodiments disclosed herein.

Regarding FIG. 1, shown is an example of an embodiment of a system 10 that may be used in connection with performing the techniques described herein. The system 10 includes a data storage system 12 connected to host systems 14a-14n through communication medium 18. In embodiments, the hosts 14a-14n can access the data storage system 12, for example, to perform input/output (I/O) operations or data requests. In embodiments, the hosts 14a-n can operate one or more guest machines (e.g., virtual machines (VMs) 23 of FIG. 2) run by a hypervisor 22. In such embodiments, the hosts 14a-n can perform I/O operations or data requests via the guest machines. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and the data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n or guest machines can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by DELL Technologies of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The techniques described herein can be used in an embodiment in which one or more of the devices 16a-16n are flash drives or devices. More generally, the techniques herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The HA 21 can interface with the hypervisor 22 to establish one or more guest machines for the hosts 14a-n. The data storage array 12 can include one or more RAs (e.g., RA 40) that may be used, for example, to facilitate communications between data storage arrays. The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs) via, e.g., the HA 21. The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two data storage arrays. The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

The hypervisor 22 can run one or more VMs (e.g. guest machines) and provision each guest machine with a guest operating system (OS) (e.g., a virtual operating system running on the guest machine). Guest OSs can share virtual hardware resources such as processors and memory (e.g., the global memory 25b) of the data storage array 12. The guest machines and by extension the guest OSs can require access to persistent storage to store information (e.g., critical information). Accordingly, the data storage system can include a virtual memory (VMe) controller 28 that is communicatively coupled to the hypervisor 22 and the global memory 25b. The VMe controller 28 can allocate a subset of physical non-volatile (NV) memory corresponding to the global memory 25b to be virtualized for use by the guest machines. Once the subset of the physical NV memory is allocated, the VMe controller 25 can provide each of the guest machines with virtual NV memory for persistent storage of information (e.g., data).

Figure 2:
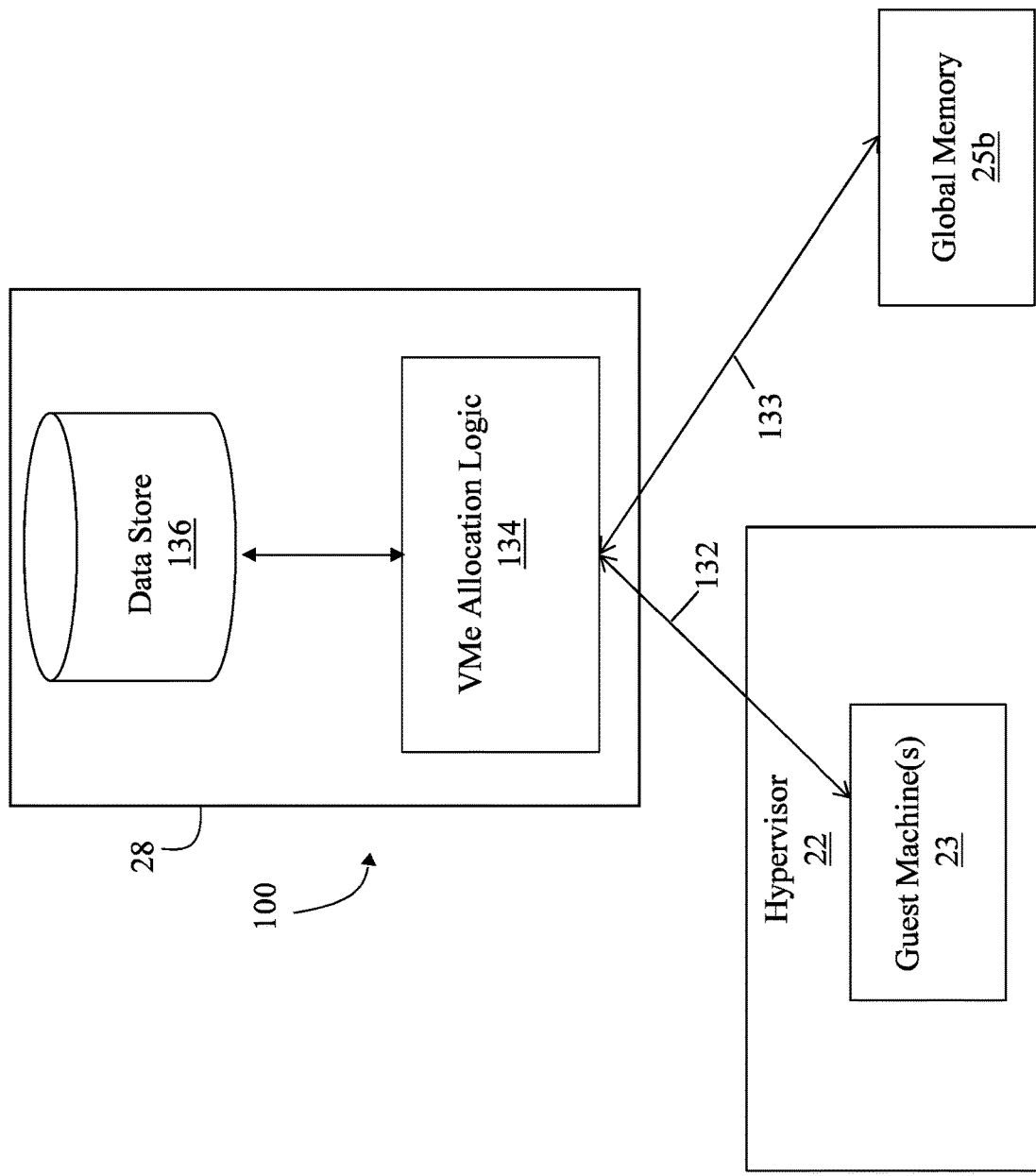
FIG. 2 is a block diagram of an example virtual memory (VMe) processor in accordance with example embodiments disclosed herein.

Regarding FIG. 2, a virtual memory (VMe) controller 28, which may be substantially like the VMe controller 28 of FIG. 1, can include elements 100 (e.g., software and hardware elements). It should be noted that the VMe controller 28 may be any one of a variety of commercially available processors, such as an Intel-based processor, and the like. Although what is described herein shows details of components including software that may reside in the controller 28, all or portions of the illustrated components may also reside elsewhere such as, for example, on HA 21 of FIG. 1 or a hypervisor 22 which can be substantially like the hypervisor 22 of FIG. 1. The hypervisor 22 may be any one of a variety of commercially available processors, such as an Intel-based processor, and the like. In embodiments, each of the VMe controller 28 and the hypervisor 22 can be a parallel processor such as a graphical processing unit (GPU).

Included in the VMe controller 28 is VMe allocation logic 134 which can allocate a subset of physical non-volatile (NV) memory corresponding to global memory 25b to be virtualized for use by one or more guest machines 23 (e.g., VMs) run by the hypervisor 22 via connection 133 (e.g., a SCSI, Fibre Channel, iSCSI, and the like). For example, the VMe controller 28 can identify blocks of physical NV memory available for such allocation by performing a search of memory block assignments of the global memory 25b. The memory assignment can be stored in a data store 136 as a searchable data structure (e.g., a look-up table or the like). Although the data store 136 is shown as an element of the VMe controller 28, a skilled artisan understands the data store 136 can be external to the controller 28 and provided as an independent element of the system 12 or integrated as part of any element of the system 12. It should also be noted that physical NV memory may be any one of a variety of commercially available NV memory, such as read-only memory, flash memory, and ferroelectric random-access memory (RAM), and the like. The subset of physical NV memory can include blocks of contiguous and/or non-contiguous physical NV memory of the global memory 25b. Additionally, the subset of NV memory can be mirrored and vaulted as can the global memory 25b, in its entirety, by the storage array 12 of FIG. 1 according to any technique known or yet to be known by those skilled in the art. Thus, any data stored by guest machines 23 in virtual NV memory can also mirrored and vaulted according to such techniques.

The VMe controller 28 can be further configured to monitor requests received by hypervisor 22 by one or more hosts (e.g., any set of the hosts 14a-n) for one or guest machines 23 via connection 132 (e.g., SCSI, Fibre Channel, iSCSI, and the like). In response to each request, the hypervisor 22 can establish a guest machine 23 and provide each guest machine 23 with a unique identifier (ID). The VMe controller 28 can provide the guest machine 23 with virtual NV memory that corresponds to at least a portion of the subset of the physical NV memory and store mappings of physical NV memory to virtual NV memory in the data store 136 as described in further detail herein with respect to FIG. 3. To execute I/O operations of a guest machine 23 involving the virtual NV memory, the hypervisor 22 translates each virtual NV memory block to its corresponding physical NV memory block using the mappings stored in the data store 136. The mappings can be stored in a searchable data structure (e.g., an index) that associates each map with a particular guest machine based on the guest machine ID.

In embodiments, each request by the one or more hosts can include a host ID. The VMe controller 28 can perform a look-up of guest user profiles associated with each host by searching a guest user profile index stored in the data store. The guest user profile index associates one or more guest user profiles to each host based on each host's host ID. Each guest user profile can include information such as applications required, memory requirements, processing requirements, and/or NV memory amongst other computing resources required by the guest machine 23 requested by the host. Accordingly, the VMe controller 28 can determine and allocate an amount of physical NV memory to the guest machine 23 based on the guest user profile.

Figure 3:
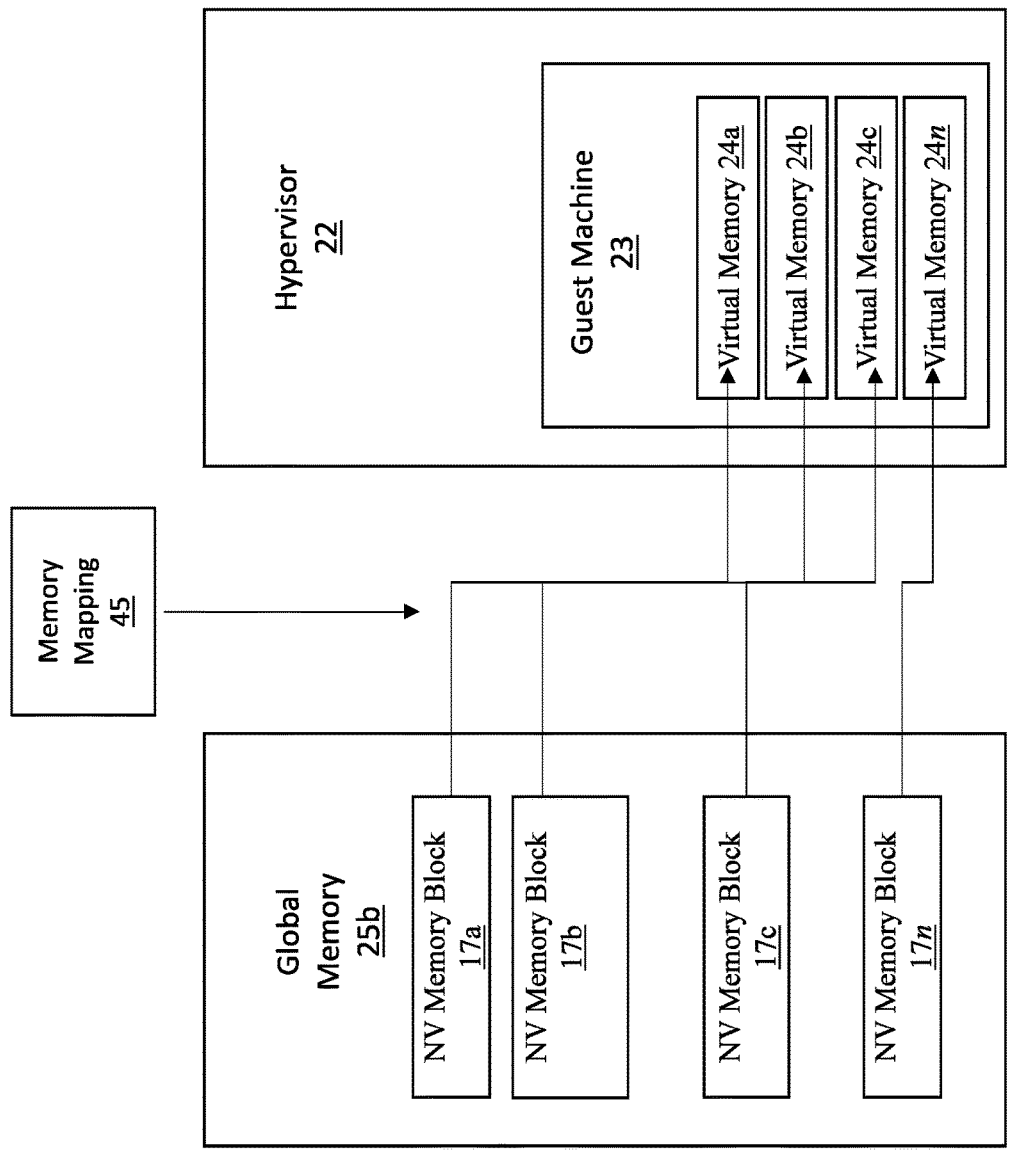
FIG. 3 is a block diagram of memory mappings between physical memory blocks of a global storage and virtual memory blocks of a virtual machine (VM) in accordance with example embodiments disclosed herein.

Regarding FIG. 3, a VMe controller (e.g., the controller 28 of FIG. 2) can create one or more blocks of virtual NV memory 24a-n for a guest machine 23 (e.g., a virtual machine (VM)) and assign each virtual block 24a-n with a unique virtual address. The VMe controller can represent the virtual blocks as a contiguous set of memory blocks by assigning each of the blocks 24a-n with contiguous virtual addresses. However, the VMe Controller 28 can assign each virtual block 24a-n with one or more contiguous and/or non-contiguous blocks of physical NV memory (e.g., blocks 17a-n) of the global memory 25b. Once the assignments are made, the VMe controller creates a memory mapping 45 that is a searchable data structure (e.g., a table or the like) that associates each virtual block 24a-n to its corresponding physical NV block 17a-n of the global memory 25b. The memory mapping 45 can be stored in an index of memory mappings in a data store (e.g., data store 136 of FIG. 2). The index of memory mappings can associate each memory mapping 45 to its corresponding guest machine 23 and/or host operating the guest machine 23. Thus, in situations of power loss, the VMe controller can use the index to obtain each memory mapping corresponding to each guest machine 23 of each host and retrieve any information stored in NV memory blocks 17a-n by each guest machine 23.

Figure 4:
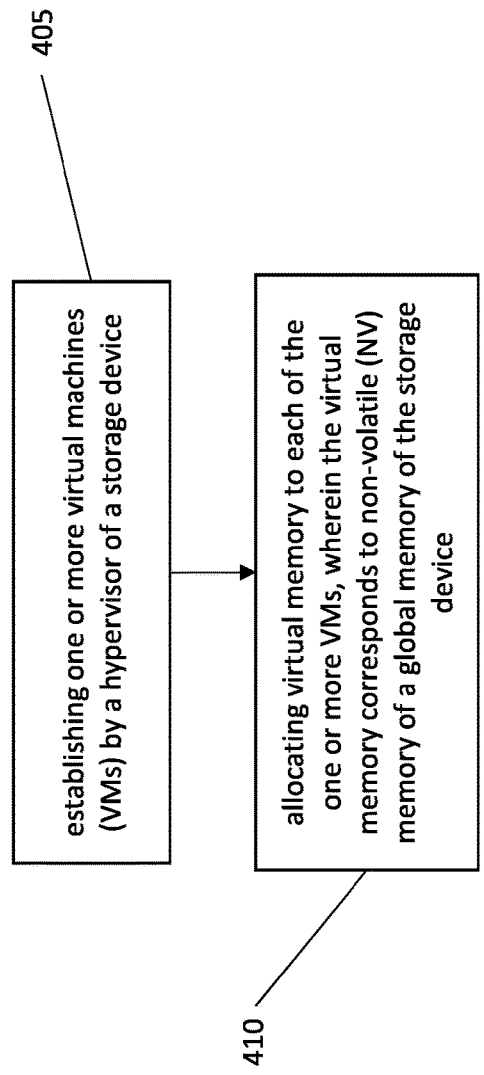
FIG. 4 is a flow diagram of an example method for allocating VMe to one or more virtual machines VMs in accordance with example embodiments disclosed herein.

Regarding FIG. 4, a method 400, at 405, includes establishing one or more virtual machines (VMs) such as guest machines 23 of FIGS. 2-3 by a hypervisor (e.g., any hypervisor 22 of FIGS. 1-3) of a storage array (e.g., array 12 of FIG. 1). The one or more guest machines can be established according to any of the techniques described herein or those that are otherwise known and/or yet to be known by a skilled artisan. The method 400, at 410, also includes allocating virtual memory (e.g., virtual memory blocks 24a-n of FIG. 3) to each of the one or more VMs, wherein the virtual memory corresponds to non-volatile (NV) memory of a global memory (e.g., the NV memory blocks 17a-n of the global memory 25b of FIG. 3) of the storage array. The virtual memory can be allocated according to any of the techniques described herein or those that are otherwise known and/or yet to be known by a skilled artisan.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and any combination of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
    establishing one or more virtual machines (VMs) by a hypervisor of a storage system for one or more host systems, wherein the storage system is communicatively coupled to the one or more host systems;
    determining one or more computing resources of at least one of the one or more host systems related to the one or more VMs by:
        performing a guest user profile look-up using each host system's corresponding host ID, and
        identifying the computing resources based the guest user's profile; and
    allocating virtual memory to the one or more host system's VMs by the storage system's hypervisor based on the determined one or more computing resources and an amount of the allocated virtual memory corresponding to a target reduction in demand of one or more external slots of the storage system, wherein the virtual memory corresponds to mirrored physical non-volatile (NV) memory of a global memory of the storage system.

2. The method of claim 1, wherein the NV memory includes one or more of: read-only memory, flash memory, and ferroelectric random-access memory (RAM).

3. The method of claim 1, wherein allocating NV memory includes:
    determining a profile of a guest user operating at least one of the VMs via an external computing device; and
    allocating the NV memory based on the determined profile.

4. The method of claim 3, wherein allocating the NV memory includes determining an amount of NV memory to allocate the at least one of the VMs operated by the guest user based on the determined profile.

5. The method of claim 1, wherein allocating the NV memory includes identifying blocks of NV memory of the global memory available for allocation to the one or more VMs.

6. The method of claim 5, wherein the blocks of NV memory include non-contiguous blocks of NV memory of the global memory.

7. The method of claim 6, further comprising representing the non-contiguous blocks of NV memory as a contiguous block of virtual NV memory to the one or more VMs.

8. An apparatus comprising at least one processor configured to:
    establish one or more virtual machines (VMs) for one or more host systems by a hypervisor of a storage system;
    determine one or more computing resources of at least one of the one or more host systems related to the one or more VMs by:
        performing a guest user profile look-up using each host system's corresponding host ID, and
        identifying the computing resources based the guest user's profile; and
    allocate virtual memory to the one or more host system's VMs by the storage system's hypervisor based on the determined one or more computing resources and an amount of the allocated virtual memory corresponding to a target reduction in demand of one or more external slots of the storage system, wherein the virtual memory corresponds to mirrored physical non-volatile (NV) memory of a global memory of the storage system.

9. The apparatus of claim 8, wherein the NV memory includes one or more of: read-only memory, flash memory, and ferroelectric random-access memory (RAM).

10. The apparatus of claim 8, wherein the apparatus is further configured to allocate NV memory by:
    determining a profile of a guest user operating at least one of the VMs via an external computing device; and
    allocating the NV memory based on the determined profile.

11. The apparatus of claim 10, wherein the apparatus is further configured to allocate NV memory by determining an amount of NV memory to allocate the at least one of the VMs operated by the guest user based on the determined profile.

12. The apparatus of claim 8, wherein allocating the NV memory includes identifying blocks of NV memory of the global memory available for allocation to the one or more VMs.

13. The apparatus of claim 12, wherein the blocks of NV memory includes non-contiguous blocks of NV memory of the global memory.

14. The apparatus of claim 13, wherein the apparatus is further configured to represent the non-contiguous blocks of NV memory as a contiguous block of virtual NV memory to the one or more VMs.

* * * * *